United States Patent
Carter et al.

(10) Patent No.: US 6,553,401 B1
(45) Date of Patent: Apr. 22, 2003

(54) SYSTEM FOR IMPLEMENTING A HIGH VOLUME AVAILABILITY SERVER CLUSTER INCLUDING BOTH SHARING VOLUME OF A MASS STORAGE ON A LOCAL SITE AND MIRRORING A SHARED VOLUME ON A REMOTE SITE

(75) Inventors: Edward D. Carter, Irmo; Ernest C. Coskrey, IV, Columbia, both of SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/350,764

(22) Filed: Jul. 9, 1999

(51) Int. Cl.[7] ............................................... G06F 15/16
(52) U.S. Cl. ...................... 709/200; 709/201; 709/202; 709/203; 714/1; 714/2; 714/4; 714/13
(58) Field of Search ................................ 709/200–203; 714/1, 2, 4, 5, 6, 13

(56) References Cited

U.S. PATENT DOCUMENTS

| | | | |
|---|---|---|---|
| 5,155,845 A | | 10/1992 | Beal et al. |
| 5,463,754 A | | 10/1995 | Beausoleil et al. |
| 5,537,533 A | * | 7/1996 | Staheli et al. ................... 714/5 |
| 5,544,077 A | | 8/1996 | Hershey |
| 5,564,019 A | | 10/1996 | Beausoleil et al. |
| 5,594,900 A | | 1/1997 | Cohn et al. |
| 5,608,865 A | * | 3/1997 | Midgely et al. ................ 714/1 |
| 5,673,382 A | | 9/1997 | Cannon et al. |
| 5,742,792 A | | 4/1998 | Yanai et al. |
| 5,764,903 A | | 6/1998 | Yu |
| 5,805,785 A | | 9/1998 | Dias et al. |
| 5,819,310 A | | 10/1998 | Vishlitzky et al. |
| 5,842,222 A | | 11/1998 | Lin et al. |
| 5,845,147 A | | 12/1998 | Vishlitzky et al. |
| 5,852,715 A | | 12/1998 | Raz et al. |
| 5,852,724 A | | 12/1998 | Glenn, II et al. |
| 5,857,208 A | | 1/1999 | Ofek |
| 5,946,463 A | * | 8/1999 | Carr et al. ................... 709/201 |
| 6,014,686 A | * | 1/2000 | Elnozahy et al. ........... 709/202 |
| 6,134,673 A | * | 10/2000 | Chrabaszcz .................. 714/13 |
| 6,336,171 B1 | * | 1/2002 | Coskrey, IV ................. 711/152 |

* cited by examiner

*Primary Examiner*—Zarni Maung
*Assistant Examiner*—Nabil El-Hady
(74) *Attorney, Agent, or Firm*—Maginot, Moore & Bowman LLP

(57) ABSTRACT

A method of providing high availability of a service includes the step of allocating the service and a shared volume of a first mass storage device associated with the service to a first server of a first subcluster that is located at a first site and that includes servers which share the first mass storage device. Another step of the method includes mirroring the shared volume to a second mass storage device of a second subcluster that is located at a second site and that includes at least one server in order to obtain a first mirrored copy of the shared volume at the second site. Yet another step of the method includes determining to reallocate said service to a first server of the second subcluster. The method also includes the step of allocating the first mirrored copy to the first server of the second subcluster. Moreover, the method includes the step of allocating the service to the first server of the second subcluster in response to the step of determining to reallocate the service to the first server of the second subcluster. Apparatus for carrying out the method are also disclosed.

20 Claims, 2 Drawing Sheets

SYSTEM FOR IMPLEMENTING A HIGH VOLUME AVAILABILITY SERVER CLUSTER INCLUDING BOTH SHARING VOLUME OF A MASS STORAGE ON A LOCAL SITE AND MIRRORING A SHARED VOLUME ON A REMOTE SITE

BACKGROUND OF THE INVENTION

The present invention relates generally to high availability of services, and more particularly to a server cluster that achieves high availability via a hybrid volume protection that includes both sharing and mirroring a volume.

Most mission critical applications are dependent on programs and data which are stored on volumes of a hard disk device. When the hard disk device becomes unavailable, the mission critical applications cease to function properly, resulting in user downtime and lost productivity.

Server clusters and high availability (HA) software products exist that protect both mission critical applications and the data on which the mission critical applications depend. In general, HA software products move an application and all dependent resources from a first computer system of a server cluster to a second computer system of the server cluster in response to a failure of the first computer system. As a result of moving all dependent resources, the second computer system of the server cluster can continue to provide the application even after a failure of the first computer system.

In order to enable movement of the data resource between computer systems of the server cluster, existing HA software products generally protect the data resources on which applications depend by either (i) storing the data resources on a shared volume of a shared storage device, or (ii) mirroring the data resources from a first storage device to a second storage device. The shared volume approach generally requires that all computer systems of the server cluster have a direct connection to the shared storage device. By having a direct connection to the shared storage device, each computer system of the server cluster has direct access to the data resources of the shared volume; however, the shared volume is generally only owned by a single computer system of the server cluster at any point in time in order to maintain data integrity on the shared resource.

Due to the shared nature of the data resources, only a single copy of the data resources need be maintained on the shared volume in order for each computer system of the server cluster to have access to the data resource. Moreover, the HA software may move the data resources associated with an application by simply updating the ownership of the shared volume. While the direct connections to the shared storage device enable each computer system to share data resources, the direct connections also generally require that all computer systems of the server cluster be within a reasonably close proximity to one another. Accordingly, known server clusters implemented with shared volumes have precluded the possibility of using any of the computer systems of the server cluster for remote disaster recovery.

On the other hand, the mirrored volume approach generally requires that all computer systems of the server cluster maintain a separate copy or mirror of the data resources stored on the mirrored volume. As a result of maintaining a separate copy of the data resources, computer systems of the server cluster can be remotely located from one another. While the mirrored volume approach enables the possibility of using a computer system of the server cluster for remote disaster recovery, the mirrored volume approach is usually more difficult to configure because the mirror volume approach often involves network-related routing issues that arise when a service is relocated from one physical location on the network to another physical location on the network. Moreover, the mirrored volume approach requires more storage space since each computer system of the server cluster maintains a separate mirrored copy of the protected data resource.

Therefore, a need exists for a method and apparatus that implement a hybrid volume protection scheme in order to obtain a high availability scheme with many of the advantages of both shared volumes and mirrored volumes.

SUMMARY OF THE INVENTION

In accordance with one embodiment of the present invention, there is provided a method of providing high availability of a service. One step of the method includes allocating the service and a shared volume of a first mass storage device associated with the service to a first server of a first subcluster that is located at a first site and that includes servers which share the first mass storage device. Another step of the method includes mirroring the shared volume to a second mass storage device of a second subcluster that is located at a second site and that includes at least one server in order to obtain a first mirrored copy of the shared volume at the second site. Yet another step of the method includes determining to reallocate said service to a first server of the second subcluster. The method also includes the step of allocating the first mirrored copy to the first server of the second subcluster. Moreover, the method includes the step of allocating the service to the first server of the second subcluster in response to the step of determining to reallocate the service to the first server of the second subcluster.

Pursuant to another embodiment of the present invention, there is provided a server cluster for providing high availability of a service. The server cluster includes a first mass storage device located at a first site, a second mass storage device located at a second site, a first subcluster located at the first site, a second subcluster located at the second site, and a cluster manager. The first mass storage device includes at least one volume associated with the service. Similarly, the second mass storage device includes at least one volume associated with the service. The first subcluster includes a plurality of servers operably coupled to the first mass storage device. Moreover, the second subcluster includes at least one server operably coupled to the second mass storage device. The cluster manager is operable to allocate the service and the at least one volume of the first mass storage device to a first server of the first subcluster, and mirror the at least one volume of the first mass storage device to the at least one volume of the second mass storage device. Moreover, the cluster manager is operable to determine to reallocate the service to a first server of the second subcluster, allocate the at least one volume of the second mass storage device to a first server of the second subcluster, and allocate the service to the first server of the second subcluster in response to determining to reallocate the service to the first server of the second subcluster.

Pursuant to yet another embodiment of the present invention, there is provided a computer readable medium for providing high availability of a service. The computer readable medium includes instructions, which when executed, cause a cluster manager to allocate the service and at least one shared volume of a first mass storage device associated with the service to a first server of a first subcluster located at a first site and comprising a plurality of servers that share the first mass storage device. The computer readable medium also includes instructions, which when executed, cause the cluster manager to mirror the at least one shared volume to a second mass storage device of a second subcluster located at a second site and comprising at least one server in order to obtain a first mirrored copy of the at least one shared volume at the second site. Moreover, the computer readable medium includes instructions, which when executed, cause a cluster manager to determine to reallocate the service to a first server of the second subcluster, allocate the first mirrored copy to the first server of the second subcluster, and allocate the service to the first server of the second subcluster in response to determining to reallocate the service to the first server of the second subcluster.

It is an object of the present invention to provide a new method and apparatus for providing highly available services.

It is an object of the present invention to provide an improved method and apparatus for providing highly available services.

It is yet another object of the present invention to provide a method and apparatus which continue to provide a service even after a server fails.

It is still another object of the present invention to provide a method and apparatus which continue to provide a service even after a site failure has occurred.

The above and other objects, features, and advantages of the present invention will become apparent from the following description and the attached drawings.

DETAILED DESCRIPTION OF AN EXEMPLARY EMBODIMENT

Figure 1:
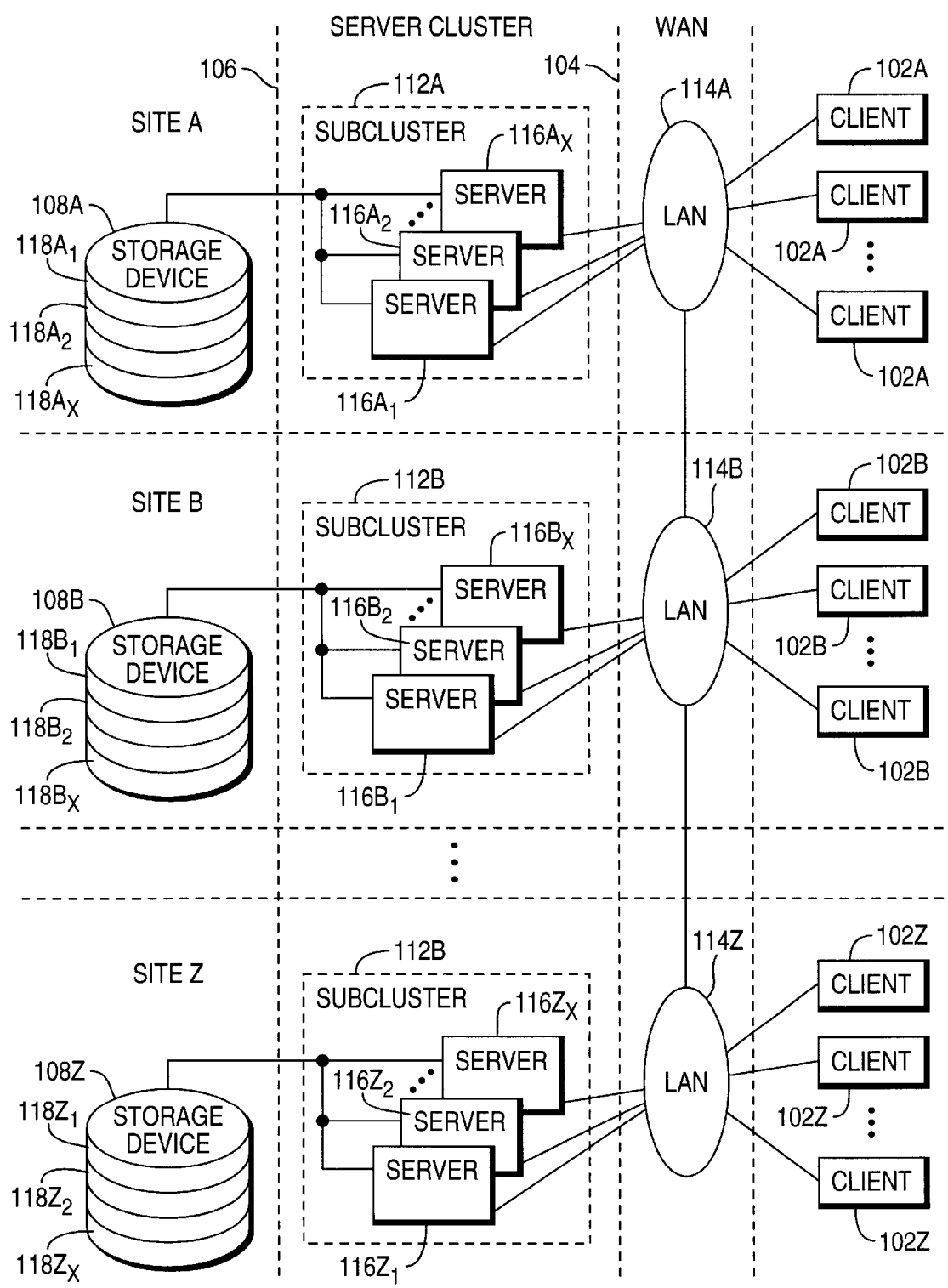
FIG. 1 shows a block diagram of a high availability system in which features of the present invention are incorporated.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

FIG. 1 illustrates an exemplary high availability system 100 which incorporates various features of the present invention therein. As depicted in FIG. 1, the high availability system 100 includes clients 102A, 102B, . . . 102Z, a wide area network (WAN) 104, a geographically distributed server cluster 106, and shared mass storage devices 108A, 108B, . . . 108Z. The clients 102A, 102B, . . . 102Z are generally operable to communicate with the server cluster 106 via the WAN 104, and access services provided by the server cluster 106 via the WAN 104. To this end, the clients 102A, 102B, . . . 102Z each include conventional computer hardware (e.g. a processor, memory, mouse, keyboard) that in combination execute client software (e.g. e-mail clients, web browsers, file managers) that provide an interface to the services of the server cluster 106.

The WAN 104 is generally operable to provide a communications link between the clients 102A, 102B, . . . 102Z and the server cluster 106. Moreover, the WAN 104 is generally operable to provide a communications link between the geographically distributed subclusters 112A, 112B, . . . 112Z of the server cluster 106. To this end, the WAN 104 includes local area networks (LAN) 114 at each geographically distributed site and links between the LANs 114. It should be appreciated by those skilled in the art that the WAN 104 may be implemented with various medium (e.g. wireless, coaxial cable, twisted wire pairs, fibre optical cables, switches, routers) and networking protocols (e.g. Ethernet, NETBUI, TCP/IP, ATM).

Each mass storage device 108A, 108B, . . . 108Z of the high availability system 100 includes at least one shared volume 118 which is accessible to any server 116 of the subcluster 112 to which the mass storage device 108 is coupled. While each mass storage device 108A, 108B, . . . 108Z in an exemplary embodiment is implement with a shared SCSI RAID device, it should be appreciated that the mass storage devices 108A, 108B, . . . 108Z may be implemented with other mass storage devices such as RAM disk drives, writable CD-ROM drives, and digital audio tape (DAT) drives. Furthermore, it should be appreciated that the mass storage devices 108A, 108B, . . . 108Z may be implemented with other mass storage interfaces such as IDE and Fibre Channel.

As illustrated in FIG. 1, the server cluster 106 of the exemplary high availability system 100 is distributed across multiple geographic locations or sites A, B, . . . Z. For example, the server cluster 106 may be distributed between departments within the same building, between cities, between states, and/or between countries. Distribution of the server cluster 106 across multiple sites enables the server cluster 106 to provide a service even after a complete site failure.

To this end, the server cluster 106 includes a subcluster 112A, 112B, . . . 112Z at each site A, B, . . . Z. In an exemplary embodiment, each subcluster 112A, 112B, . . . 112Z includes multiple server computer systems 116 that are operable to provide services to the clients 102A, 102B, . . . 102Z; however, it should be appreciated that the present invention may be practiced with some of the subclusters 112 including only a single server 116. Moreover, the servers 116 of a subcluster 112 are coupled to a respective mass storage device 108 in order to access data resources needed in providing services to the clients 102A, 102B, . . . 102Z. For example at site A, the servers $116A_1$, $116A_2$, . . . $116A_x$, of the first subcluster 112A are coupled to a first mass storage device 108A in order to access data resources associated with services provided by the first subcluster 112A.

The servers 116 of each subcluster 112 are also coupled to the WAN 104 in order to (i) communicate with one another, and (ii) provide services to the clients 102A, 102B, . . . 102Z. For example, the servers 116 of the subclusters 112A, 112B, . . . 112Z may provide any number of services such as printer services, application server services, file server services, database services, email services, proxy services, web server services, name resolution services (e.g. DNS, WINS), ftp services, news services, gateway services, and telnet services to name a few.

In an exemplary embodiment, each server 116 is implemented with conventional hardware such as processors, disk drives, network cards, and disk controllers. Moreover, each server 116A, 116B, . . . 116Z executes cluster management software and an operating system such as Windows NT in order to provide services to the clients 102A, 102B, . . . 102Z. In general, execution of the cluster management software configures the servers 116 and therefore the cluster server 106 to function as a single server from the point of view of the clients 102A, 102B, . . . 102Z. Moreover, execution of the cluster management software configures the servers 116A, 116B, . . . 116Z and therefore the cluster server 106 to implement a cluster manager.

The cluster manager provides a system administrator with an interface for defining services executed by the servers 116A, 116B, . . . 116Z of the server cluster 106. More particularly, the cluster manager allows a system administrator to designate which services are executed on which servers 116A, 116B, . . . 116Z of the server cluster 106, the resources required for each provided service, and actions to take in case one of the servers 116 of the server cluster 106 becomes unavailable. Moreover, the cluster manager causes the servers 116 of the server cluster 106 to provide the services in the manner designated by the system administrator, and carry out the designated actions in case one of the servers 116A, 116B, . . . 116Z becomes unavailable or other criteria are satisfied.

High Availability Operation of the Server Cluster

Figure 2:
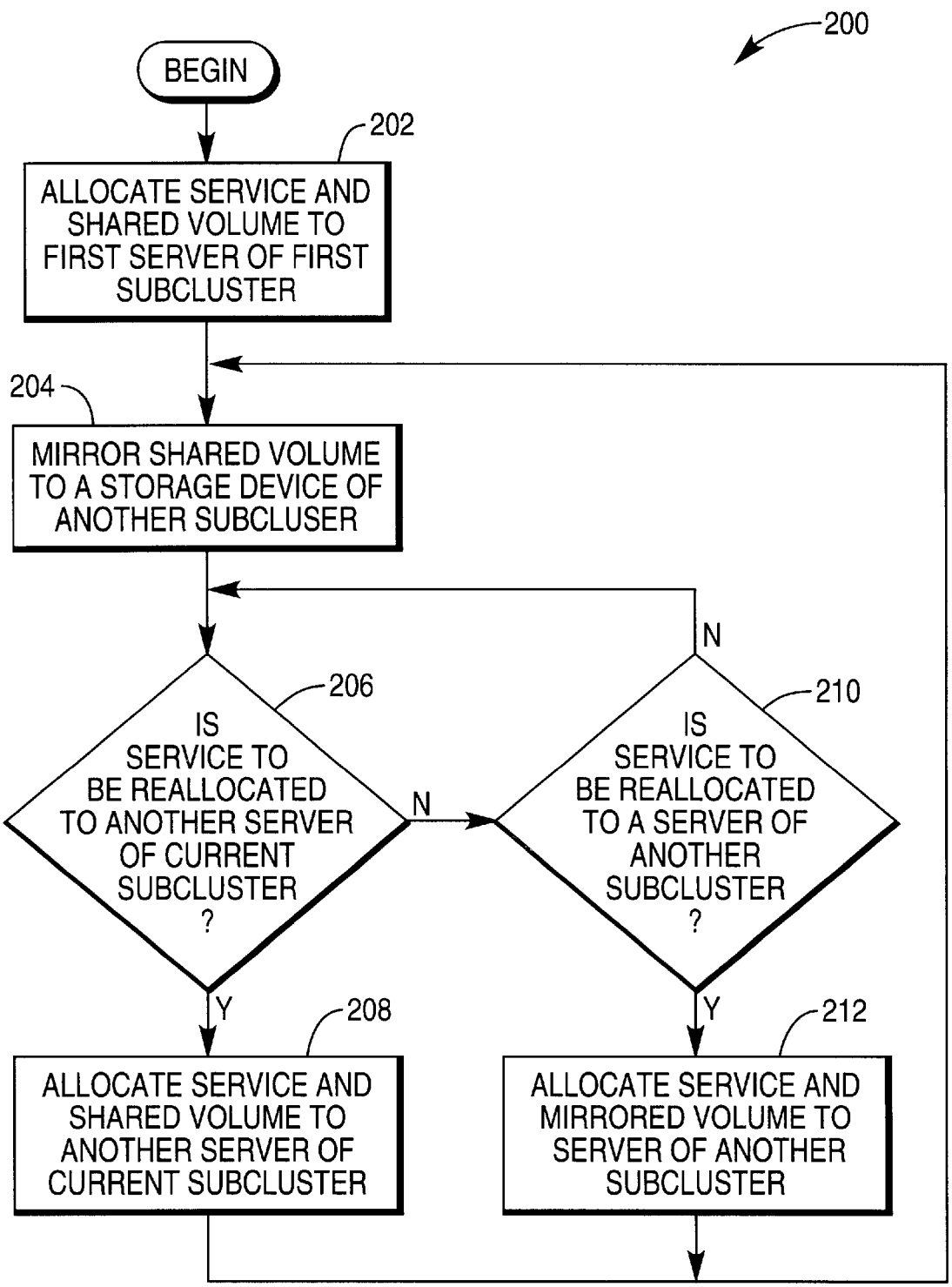
FIG. 2 shows a flowchart that illustrates an exemplary operation of the high availability system shown in FIG. 1.

Shown in FIG. 2 is a flowchart 200 which illustrates an exemplary operation of the high availability system 100 and various features of the present invention. The exemplary operation shown in FIG. 2 assumes that a system administrator has defined a protected database service requiring data resources that are stored on a first shared volume $118A_1$ of the first shared storage device 108A. Moreover, the exemplary operation assumes that the system administrator has defined service allocation/migration rules for the database service which cause the cluster manager to (i) allocate the database service and associated resources to a first server $116A_1$ of a first subcluster 112A if the first server $116A_1$ is currently available to provide the database service, (ii) allocate the database service and associated resources to another server $116A_2, \ldots 116A_x$ of the first subcluster 112A if the first server $116A_1$ is not currently available but another server $116A_2, \ldots 116A_x$ of the first subcluster 112A is available to provide the database service, and (iii) allocate the database service a to a server $116B_1, 116B_2, \ldots 116B_x$ of the second subcluster 112B if no server $116A_1, 116A_2, \ldots 116A_x$ of the first subcluster 112A is available to provide the service but a server $116B_1, 116B_2, \ldots 116B_x$ of the second subcluster 112B is available to provide the service.

The exemplary operation of the high availability system 100 begins in step 202 with the cluster manager allocating the database service and associated resources to the first server $116A_1$ of the first subcluster 112A. More specifically, the cluster manager in an exemplary embodiment grants the first server $116A_1$ ownership of the first shared volume $118A_1$ on which the data resources (e.g. data and/or applications) for the database service are stored. Moreover, the cluster manager in an exemplary embodiment allocates to the first server $116A_1$ any other required resource for the database service such as network addresses, network interfaces, and/or special hardware.

The cluster manager then in step 204 mirrors the first shared volume $118A_1$ of the first shared storage device 108A to a second shared storage device 108B of a second subcluster 112B. More specifically, the cluster manager in an exemplary embodiment mirrors the first shared volume $118A_1$ of site A to a second shared storage device 108B that is located at site B. In this manner, the cluster manager in step 204 ensures that a backup or mirror copy of the data resources associated with the database service exists at site B if the first shared storage device 108A becomes unavailable at the first site. It should be appreciated by those skilled in the art that mirroring is a continuous process. Accordingly, even though the flowchart of FIG. 2 illustrates mirroring as a distinct step of the exemplary operation, the mirror copy of the data resources stored on the second shared storage device 108B at site B is continuously being updated in order to reflect the current state of the data resources as stored on the first shared storage device 108A at site A.

In step 206, the cluster manager determines whether the database service should be reallocated to another server 116A, 116B, . . . 116Z of the current subcluster 112A, 112B, . . . 112Z to which the service is allocated. The cluster manager in an exemplary embodiment determines whether the database service should be reallocated to another server 116A, 116B, . . . 116Z of the current subcluster 112A, 112B, . . . 112Z to which the service is allocated based upon availability of the servers 116A, 116B, . . . 112Z of the current subcluster 112A, 112B, . . . 112Z. For example, if the database service is currently allocated to the first server $116A_1$ of the first subcluster 112A, then the cluster manager in step 206 determines whether the database service should be reallocated to another server $116A_2, \ldots 116A_x$ of the first subcluster 112A based upon the availability of the servers $116A_1, 116A_2, \ldots 116A_x$ of the first subcluster 112A.

A server 116A, 116B, . . . 116Z may be unavailable to provide the database service for many reasons such as a hardware failure of the server, a software failure of the server, a power failure of the site at which the server is located, and/or a network failure preventing clients 102A, 102B, . . . 102Z access to the server. In an exemplary embodiment, the cluster manager determines whether a server 116A, 116B, . . . 116Z of the current subcluster 112A, 112B, . . . 112Z is available based upon heartbeat signals transmitted amongst the servers 116A, 116B, . . . 116Z of the server cluster 106.

Moreover, the cluster manager in an exemplary embodiment further determines whether the database service should be reallocated to another server 116A, 116B, . . . 116Z of the current subcluster 112A, 112B, . . . 112Z based upon other performance factors of the servers 116A, 116B, . . . 116Z of the current subcluster 112A, 112B, . . . 112Z. More specifically, the cluster manager may be configured to take into account memory load of the servers, the processing load of the servers, free storage capacity available to servers, and/or data transfer latency of the servers. For example, the cluster manager may determine to reallocate the database service to the second server $116A_2$ of the first subcluster 112A in response to the first server $116A_1$ having a high processing load and the second server $116A_2$ having a relatively low processing load.

If the cluster manager in step 206 determines that the database service should be reallocated to another server 116A, 116B, . . . 116Z of the current subcluster 112A, 112B, . . . 112Z, then the cluster manager in step 208 allocates the database service and associated resources to another server 116A, 116B, . . . 116Z of the current subcluster 112A, 112B, . . . 112Z and returns to step 204 in order to update the mirrored volume. More specifically, if the cluster manager in step 206 determines to reallocate the database service to the second server $116A_2$ of the first subcluster 112A, then the cluster manager in step 206 (i) grants the second server $116A_2$ ownership of the first shared volume $118A_1$ on which the data resources for the database service are stored, and (ii) allocates to the second server $116A_2$ any other resources required for the database service such as network addresses, network interfaces, and/or special hardware.

If, however, the cluster manager in step 206 determines that the database service should not be reallocated to another server 116A, 116B, . . . 116Z of the current subcluster 112A, 112B, . . . 112Z, then the cluster server in step 210 determines whether the database service should be reallocated to a server 116A, 116B, . . . 116Z of another subcluster 112A, 112B, . . . 112Z. Similar to the determination made in step 206, the cluster manager may determine whether the database service should be reallocated to a server 116A, 116B, . . . 116Z of another subcluster 112A, 112B, . . . 112Z based upon availability of servers 116A, 116B, . . . 116Z of the other subclusters 112B, . . . 112Z and other performance factors (e.g. a memory load, processing load) of the servers 116A, 116B, . . . 116Z. For example, if the database service is currently allocated to the first server $116A_1$ of the first subcluster 112A, then the cluster manager may determine to reallocate the database service to the first server $116B_1$ of the second subcluster 112B based upon determining (i) that no server $116A_1$, $116A_2$, . . . $116A_x$ of the current subcluster 112A is currently available to provide the database service, and (ii) that the first server $116B_1$ of the second subcluster 112B has the lightest processing load of the available servers 116B, . . . 116Z.

If the cluster manager in step 210 determines that the database service should be reallocated to a server 116A, 116B, . . . 116Z of another subcluster 112A, 112B, . . . 112Z, then the cluster server in step 212 allocates the database service and associated resources to a server 116A, 116B, . . . 116Z of another subcluster 112A, 112B, . . . 112Z. More specifically, if the cluster manager in step 210 determines to reallocate the database service to the second server $116B_2$ of the second subcluster 112B, then the cluster manager in step 212 (i) grants the second server $116B_2$ ownership of the shared volume 118B on which the mirror copy of the data resources for the database service are stored, and (ii) allocates to the second server $116B_2$ of the second subcluster 112B any other resources required for the database service such as network addresses, network interfaces, and/or special hardware.

After step 212 or if the cluster manager determines in step 210 that the database service does not need reallocation, then the cluster manager returns step 204 in order to update the mirrored copy of the data resources and to determine whether performance of the cluster server 106 has changed sufficiently enough to warrant reallocation of the database service. By continually re-executing steps 206 and 210, the cluster manager is operable to detect changes in the performance of the cluster server 106 that require reallocation of services in order to maintain high availability of the service.

It should be appreciated that during operation of the high availability system 100, the cluster manager may reallocate services several times and the reallocations may occur between servers 116 of a single subcluster 112 and between servers 116A, 116B, . . . 116Z of multiple subclusters 112A, 112B, . . . 112Z if each subcluster 112A, 112B, . . . 112Z maintains a mirrored copy of the data resources associated with the given service. Moreover, it should be appreciated that if a subcluster 112A, 112B, . . . 112Z becomes unavailable the mirrored copy of the data resources for the unavailable subcluster 112A, 112B, 112Z may become outdated during the period of unavailability. Accordingly, the cluster manager may need to wait until the mirror copy of data resources associated with a once unavailable subcluster 112A, 112B, . . . 112Z are brought up-to-date before allocating a service to a server 116A, 116B, . . . 116Z of the once unavailable subcluster 112A, 112B, . . . 112Z.

It should be further appreciated that the distributed nature of the cluster server 106 and the mirroring of data resources between sites protects a service from a complete site failure. For example, if a database service is being provided by a first server $116A_1$ of a first subcluster 112A located in San Francisco, Calif. and a complete site failure occurs due to an earthquake in San Francisco, the cluster manager may reallocate the database service to a first server $116B_1$ of a second subcluster 112B located in Indianapolis, IN without an appreciable interruption of service.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of providing high availability of a service, comprising the steps of:
   (a) allocating said service and at least one shared volume of a first mass storage device associated with said service to a first server of a first subcluster that (i) is located at a first site, and (ii) comprises a plurality of servers that share said first mass storage device;
   (b) mirroring said at least one shared volume to a second mass storage device of a second subcluster that (i) is located at a second site, and (ii) comprises at least one server in order to obtain a first mirrored copy of said at least one shared volume at said second site;
   (c) determining to reallocate said service to a first server of said second subcluster;
   (d) allocating said first mirrored copy to said first server of said second subcluster; and
   (e) allocating said service to said first server of said second subcluster in response to step (c).

2. The method of claim 1, wherein step (c) further comprises the steps of:
   determining that said first server of said first subcluster is unavailable to provide said service.

3. The method of claim 1, wherein step (c) further comprises the step of:
   determining that no server of said first subcluster is currently available to provide said service.

4. The method of claim 3, further comprising prior to step (c) the steps of:
   determining to reallocate said service to a second server of said first subcluster; and
   allocating said service and said at least one shared volume to said second server of said first subcluster in response to said step of determining to reallocate said service to said second server of said first subcluster.

5. The method of claim 3, further comprising after step (e) the steps of:
   determining that at least one server of said first subcluster is currently available to provide said service;
   updating said at least one shared volume associated with said service based upon said first mirrored copy in response to said step of determining that at least one server of said first subcluster is currently available to provide said service;
   allocating said at least one shared volume to a second server of said first subcluster; and allocating said service to said second server after said step of updating said at least one shared volume.

6. The method of claim 3, further comprising after step (e) the steps of:
    determining that said first server of said first subcluster is currently available to provide said service;
    updating said at least one shared volume associated with said service based upon said first mirrored copy in response to said step of determining that said first server of said first subcluster is currently available to provide said service; and
    allocating said service to said first server after said step of updating said at least one shared volume.

7. The method of claim 1, further comprising after step (e) the steps of:
    determining that said first server of said second subcluster is currently unavailable to provide said service;
    determining that a second server of said second subcluster is currently available to provide said service; and
    allocating said service and said first mirrored copy to second server of said second subcluster in response to said steps of (i) determining that said first server of said second subcluster is currently unavailable to provide said service, and (ii) determining that said second server of said second subcluster is currently available to provide said service.

8. A server cluster for providing high availability of a service, comprising:
    a first mass storage device located at a first site and comprising at least one volume associated with said service;
    a second mass storage device located at a second site and comprising at least one volume associated with said service;
    a first subcluster located at said first site and comprising a plurality of servers operably coupled to said first mass storage device;
    a second subcluster located at said second site and comprising at least one server operably coupled to said second mass storage device; and
    a cluster manager operable to:
        allocate said service and said at least one volume of said first mass storage device to a first server of said first subcluster,
        mirror said at least one volume of said first mass storage device to said at least one volume of said second mass storage device,
        determine to reallocate said service to a first server of said second subcluster,
        allocate said at least one volume of said second mass storage device to said first server of said second subcluster, and
        allocate said service to said first server of said second subcluster in response to detecting a first failure of said first server of said first subcluster.

9. The server cluster of claim 8, wherein said cluster manager is further operable to determine to reallocate said service to said first server of said second subcluster based upon:
    determining that said first server of said first subcluster is unavailable to provide said service.

10. The server cluster of claim 8, wherein said cluster manager is further operable to determine to reallocate said service to said first server of said second subcluster based upon:
    determining that no server of said first subcluster is currently available to provide said service prior to allocating said service to said first server of said second subcluster.

11. The server cluster of claim 9, wherein said cluster manager prior to determining to reallocate said service to said first server of said second subcluster is further operable to:
    determine to reallocate said service to a second server of said first subcluster; and
    allocate said service and said at least one volume of said first mass storage device to said second server of said first subcluster in response to determining to reallocate said service to said second server of said first subcluster.

12. The server cluster of claim 9, wherein said cluster manager after allocating said service to said first server of said second subcluster is further operable to:
    determine that at least one server of said first subcluster is currently available to provide said service,
    update said at least one volume of said first mass storage device based upon said at least one volume of said second mass storage device in response to determining that at least one server of said first subcluster is currently available to provide said service,
    allocate said at least one volume of said first mass storage device to a second server of said first subcluster, and
    allocate said service to said second server after updating said at least one volume of said first mass storage device.

13. The server cluster of claim 9, wherein said cluster manager after allocating said service to said first server of said second subcluster is further operable to:
    determining that said first server of said first subcluster is currently available to provide said service,
    update said at least one volume of said first mass storage device based upon said at least one volume of said second mass storage device in response to determining that said first server of said first subcluster is currently available to provide said service, and
    allocate said service to said first server after updating said at least one volume of said first mass storage device.

14. The server cluster of claim 8, further comprising:
    a third mass storage device located at a third site and comprising at least one volume associated with said service; and
    a third subcluster located at said third site and comprising at least one server operably coupled to said third mass storage device, wherein
    said cluster manager after allocating said service to said first server of said second subcluster is further operable to:
    mirror said at least one volume of said second mass storage device to said at least one volume of said third mass storage device,
    determine that no server of said second subcluster is currently available to provide said service,
    determine that a first server of said third subcluster is currently available to provide said service in response to determining that no server of said second subcluster is currently available to provide said service,
    allocate said at least one volume of said third mass storage device to said first server of said third subcluster, and
    allocate said service to said first server of said third subcluster in response to determining that said first server of said third subcluster is currently available to provide said service.

15. A computer readable medium for providing high availability of a service, comprising a plurality of instructions, which when executed, cause a cluster manager to:

allocate said service and at least one shared volume of a first mass storage device associated with said service to a first server of a first subcluster that (i) is located at a first site, and (ii) comprises a plurality of servers that share said first mass storage device;

mirror said at least one shared volume to a second mass storage device of a second subcluster that (i) is located at a second site, and (ii) comprises at least one server in order to obtain a first mirrored copy of said at least one shared volume at said second site;

determine to reallocate said service to a first server of said second subcluster;

allocate said first mirrored copy to said first server of said second subcluster; and allocate said service to said first server of said second subcluster in response to determining to reallocate said service to said first server of said first subcluster.

16. The computer readable medium of claim 15, wherein said plurality of instructions which when executed, further cause a said cluster manager to determine to reallocate said service to said first server of said first subcluster based upon:

determining that said first server of said first subcluster is unavailable.

17. The computer readable medium of claim 15, wherein said plurality of instructions which when executed, further cause said cluster manager to determine to reallocate said service to said first server of said second subcluster based upon:

determining that no server of said first subcluster is currently available to provide said service.

18. The computer readable medium of claim 15, wherein said plurality of instructions which when executed, further cause said cluster manager prior to allocating said service to said first server of said second subcluster to:

determine that a second server of said first subcluster is currently available to provide said service, and allocate said service and said at least one shared volume to said second server of said first subcluster in response to determining that said second server of said first subcluster is currently available to provide said service.

19. The computer readable medium of claim 15, wherein said plurality of instructions which when executed, further cause said cluster manager after allocating said service to said first server of said second subcluster to:

determine that at least one server of said first subcluster is currently available to provide said service, update said at least one shared volume of said first mass storage device based upon said first mirrored copy in response to determining that at least one server of said first subcluster is currently available to provide said service, allocate said at least one shared volume to a second server of said first subcluster, and allocate said service to said second server of said first subcluster after updating said at least one shared volume.

20. The computer readable medium of claim 15, wherein said plurality of instructions which when executed, further cause said cluster manager after allocating said service to said first server of said second subcluster to:

determine that a second server of said first subcluster is currently available to provide said service, update said at least one shared volume associated with said service based upon said first mirrored copy in response to determining that said second server of said first subcluster is currently available to provide said service, and allocate said service to said second server of said first subcluster after updating said at least one shared volume.

* * * * *